(12) United States Patent
Kim et al.

(10) Patent No.: US 7,484,268 B2
(45) Date of Patent: Feb. 3, 2009

(54) HINGE DEVICE AND PORTABLE TERMINAL HAVING THE SAME

(75) Inventors: Do-Hun Kim, Gyeongsangbuk-do (KR); Sung-Sun Park, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 254 days.

(21) Appl. No.: 11/194,571

(22) Filed: Aug. 2, 2005

(65) Prior Publication Data

US 2006/0059659 A1 Mar. 23, 2006

(30) Foreign Application Priority Data

Sep. 17, 2004 (KR) ...................... 10-2004-0074561
Nov. 18, 2004 (KR) ...................... 10-2004-0094643

(51) Int. Cl.
*E05D 11/10* (2006.01)
(52) U.S. Cl. .......................................... 16/330; 16/303
(58) Field of Classification Search ............ 379/433.12, 379/433.13; 455/575.1, 575.3, 575.4, 575.8, 455/550.1, 90.3, 550, 575; 16/330, 303, 16/304, 341, 273; 348/373, 333.06, 794
See application file for complete search history.

(56) References Cited

U.S. PATENT DOCUMENTS

| | | | |
|---|---|---|---|
| 6,292,980 B1 | 9/2001 | Yi et al. | |
| 6,789,292 B2 * | 9/2004 | Oshima et al. | 16/297 |
| 7,155,780 B2 * | 1/2007 | Chen | 16/326 |
| 7,315,620 B2 * | 1/2008 | Kato | 379/433.13 |
| 2003/0040288 A1 * | 2/2003 | Kang et al. | 455/90 |
| 2004/0181909 A1 * | 9/2004 | Kawamoto | 16/330 |
| 2005/0200740 A1 * | 9/2005 | Kim et al. | 348/335 |
| 2005/0220294 A1 * | 10/2005 | Gupte | 379/433.13 |
| 2005/0250560 A1 * | 11/2005 | Gupte et al. | 455/575.3 |
| 2005/0261041 A1 * | 11/2005 | Im | 455/575.3 |
| 2005/0283945 A1 * | 12/2005 | Pan | 16/221 |
| 2006/0019726 A1 * | 1/2006 | Park et al. | 455/575.1 |
| 2006/0042044 A1 * | 3/2006 | Hwang et al. | 16/22 |
| 2006/0268142 A1 * | 11/2006 | Yi et al. | 348/333.06 |

* cited by examiner

*Primary Examiner*—Chuck Y. Mah
(74) *Attorney, Agent, or Firm*—Roylance, Abrams, Berdo & Goodman, L.L.P.

(57) ABSTRACT

A portable terminal has a first side hinge arm positioned on a side of one of its housings and a second side hinge arm positioned on the other side of the other housing. A hinge device rotatably couples the housings and generates a rotational force to fold or unfold them. The hinge device makes the assembly process easy and contributes to diversification of terminal design. One of the housings can reverse its front and rear surfaces when unfolded, due to a dual hinge construction, for more convenient use of the portable terminal having a camera device.

22 Claims, 16 Drawing Sheets

HINGE DEVICE AND PORTABLE TERMINAL HAVING THE SAME

CROSS-REFERENCE TO RELATED APPLICATIONS

This application claims the benefit under 35 U.S.C. § 119 (a) of Korean Patent Application Serial No. 2004-74561, entitled "Hinge Device and Portable Terminal Having the Same," and filed with the Korean Intellectual Property Office on Sep. 17, 2004, and Korean Patent Application Serial No. 2004-94643, also entitled "Hinge Device and Portable Terminal Having the Same," and filed with the Korean Intellectual Property Office on Nov. 18, 2004. The entire disclosures of both of these applications are incorporated herein by reference.

BACKGROUND OF THE INVENTION

1. Field of the Invention

The present invention relates to a portable terminal. More particularly, the present invention relates to a hinge device for a portable terminal and a portable terminal having the same.

2. Description of the Related Art

In general, a portable terminal is an appliance used to provide wireless communication between users or between a user and a service provider using telecommunication base stations. In addition to voice communication service, portable terminals provide various content, including short message service (SMS), mobile banking, television, online games, and video on demand (VOD).

Portable terminals may be classified into several type of terminals based on their appearance. Bar-type terminals have input and output devices (including a communication circuit, a transmitter unit, and a receiver unit) installed on a single housing. Flip-type terminals have a flip cover installed on a bar-type housing. Folder-type terminals have a pair of housings rotated to fold towards or unfold away from each other (the input and output devices are distributed on the corresponding housings). Sliding-type terminals have a pair of housings adapted to linearly reciprocate to be opened or closed. Swing-type terminals have a pair of housing adapted to rotate while facing each other to be opened or closed. Together with folder-type terminals, sliding-type and swing-type terminals have recently appeared to satisfy users' various tastes with improved portability and user convenience. Those skilled in the art will readily appreciate these various classifications of portable terminals.

Flip-type or folder-type terminals have a hinge device to rotatably couple the housing to a flip cover or to another housing. In general, the hinge device of portable terminals is positioned between a housing and a flip cover or another housing to provide the flip cover or one of the housings with a rotation axis, as well as a rotational force depending on the opening/closing angle.

For example, a first housing of a folder-type terminal has a pair of side hinge arms. The hinge arms are spaced apart from and face each other. The second housing has a center hinge arm that is located between and rotatably coupled to the side hinge arms. The folder-type terminal has a hinge device contained in the side hinge arms or the center hinge arm to provide a rotation axis and a rotational force.

Various types of a hinge devices are disclosed in U.S. Pat. No. 6,292,980 (Sep. 25, 2001).

The assembly process for conventional hinge devices for portable terminals is inconvenient, and limits the design of the terminal. This is because the center hinge arm of the flip cover or one of the housings must be coupled between the side hinge arms while a hinge module or hinge dummy is coupled to both ends of the center hinge arm.

Accordingly, there is a need for an improved hinge apparatus for portable terminals.

SUMMARY OF THE INVENTION

An aspect of the present invention is to solve at least the above problems and/or disadvantages and to provide at least the advantages described below. Accordingly, an aspect of the present invention is to provide a hinge device that makes it easy to couple a pair of housings, and a portable terminal having the same.

Another aspect of the present invention is to provide a hinge device for a portable terminal that makes diverse terminal designs possible, and a portable terminal having the hinge device.

In accordance with an aspect of the present invention, a hinge device for a portable terminal includes a first hinge housing. A first hinge cam is received in the first hinge housing in such a manner that it can move linearly therein in the longitudinal direction of the hinge housing. A hinge shaft extends through the first hinge cam in the longitudinal direction and is rotatably coupled to the first hinge housing. A second hinge housing is fixed to the hinge shaft and is adapted to rotate relative to the first hinge housing while enclosing it.

In accordance with another aspect of the present invention, a portable terminal has a first housing with a first side hinge arm on a side of the housing. A second housing has a second side hinge arm on the side of the housing that faces the first side hinge arm. The second housing is adapted to rotate towards or away from the first housing to be folded or unfolded. A first hinge housing is fixed to the second side hinge arm. A hinge shaft is rotatably coupled to the first hinge housing. A second hinge housing is fixed to the first side hinge arm and the hinge shaft while enclosing the outer peripheral surface of the first hinge housing.

In accordance with another aspect of the present invention, a hinge device for a portable terminal has a first housing and a second housing. The second housing is adapted to rotate about a first hinge axis to be folded on or unfolded from the first housing while facing it and to rotate about a second hinge axis extending in a direction perpendicular to the first hinge axis when unfolded from the first housing. A hinge device rotatably couples the first and second housings to each other. The hinge device includes a first hinge module received in the first housing to generate a rotational force for folding or unfolding the second housing about the first hinge axis. A coupling housing is positioned along the first hinge axis and fixed to the first housing. A hinge housing is coupled to the coupling housing and adapted to rotate about the first hinge axis by means of the rotational force from the first hinge module. A second hinge module is coupled to the hinge housing and has a rotary shaft adapted to rotate about the second hinge axis and fixed to the second housing.

In accordance with another aspect of the present invention, a portable terminal includes a first housing and a second housing. The second housing is adapted to rotate about a first hinge axis to be folded on or unfolded from the first housing while facing it. A hinge device rotatably couples the first and second housings to each other. A first side hinge arm is positioned on a side of the first housing. A second side hinge arm is positioned on the other side of the second housing with an end coupled to the end of the first side hinge arm while facing it and adapted to rotate about the first hinge axis. A first hinge module is positioned on the hinge device to rotatably couple the first and second side hinge arms to each other.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As shown in FIGS. 1 to 4, a hinge device 100 for a portable terminal according to an embodiment of the present invention includes first and second hinge housings 101 and 102.

Figure 5:
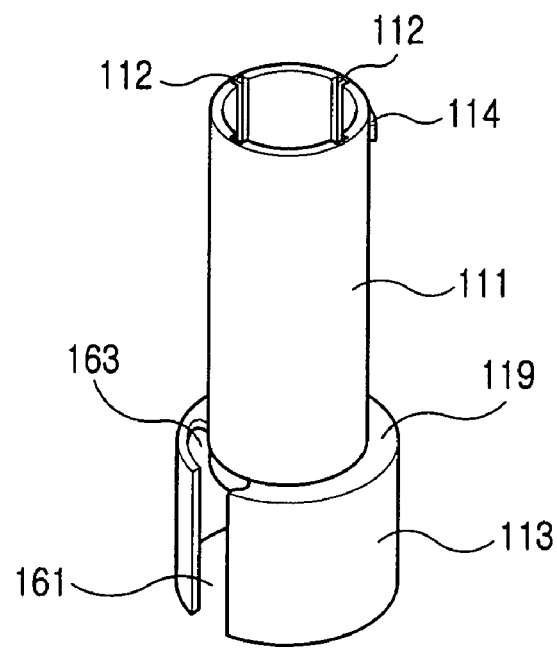
FIG. 5 is a perspective view illustrating a first hinge housing of the hinge device shown in FIG. 1.

Referring to FIG. 5, the first hinge housing 101 includes a first housing portion 111 having a cylindrical shape. A second housing portion 113 extends from an end of the first housing portion 111 and has a diameter larger than that of the first housing portion 111 so that a stepped surface 119 is provided between the first and second housing portions 111 and 112.

The first housing portion 111 has at least one longitudinal guide groove 112 on the inner peripheral surface. The outer peripheral surface has a first stopper 114. The stopper extends a distance corresponding to a predetermined angular range in the circumferential direction.

The second housing portion 113 has a first slit 161 on the outer peripheral surface for communication between the interior and exterior of the second housing portion. The stepped surface 119 has a third slit 163, which is connected to the first slit 161.

The second housing portion 113 has fastening holes 199a on the end wall of the second housing portion 113 to provide a coupling means to the terminal.

Figure 1:
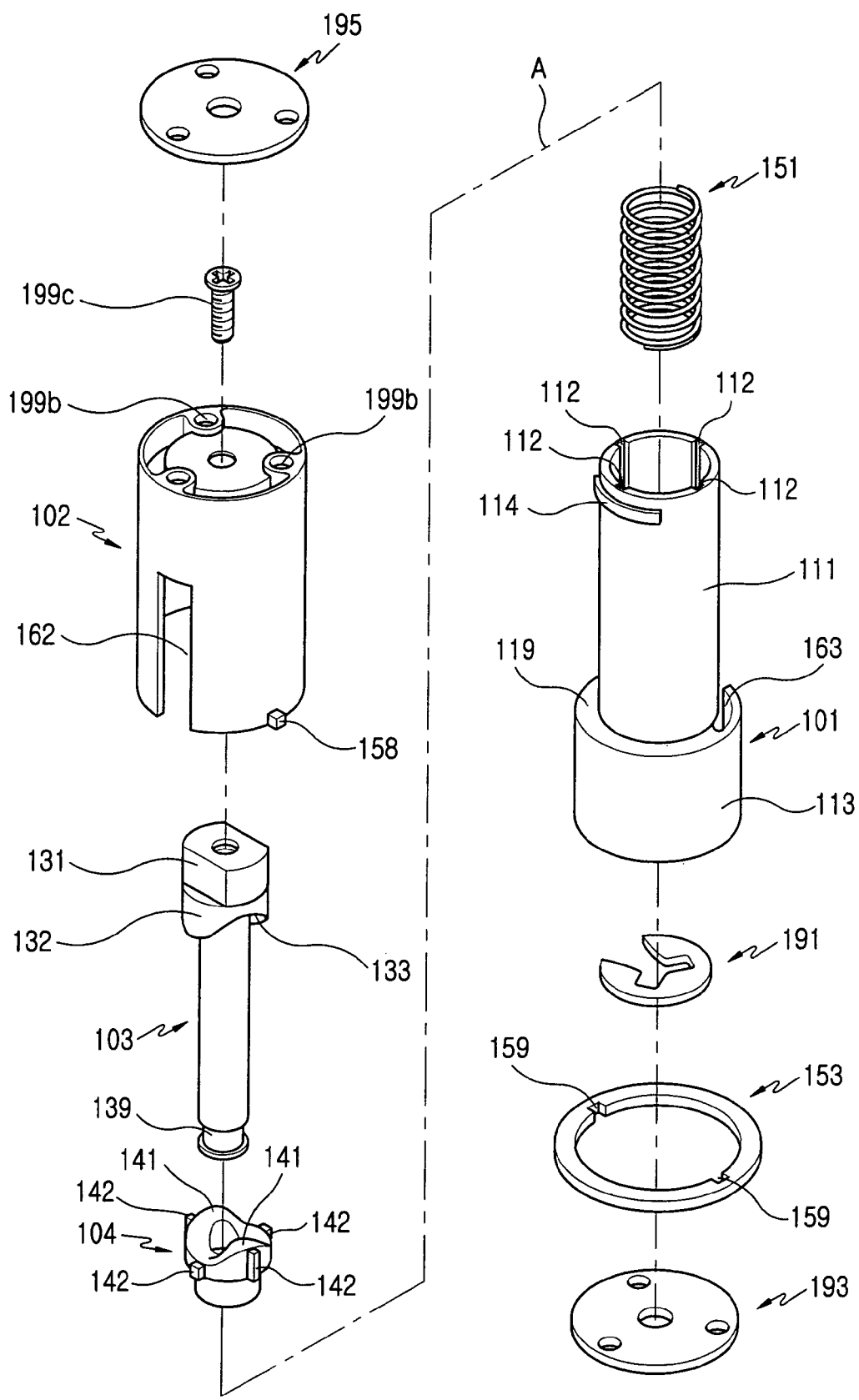
FIG. 1 is an exploded perspective view of a hinge device for a portable terminal according to an embodiment of the present invention.
Figure 2:
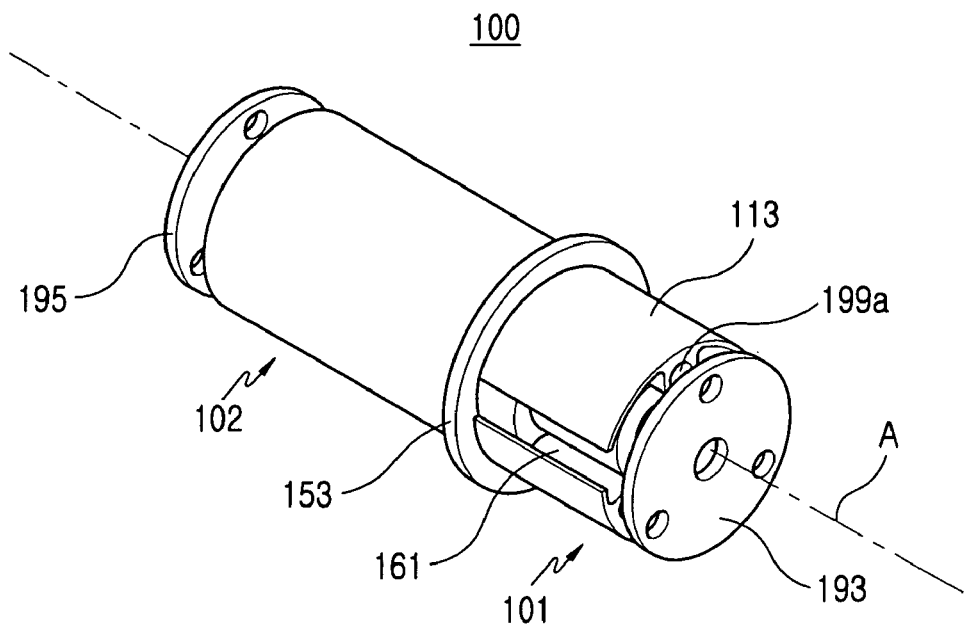
FIG. 2 is an assembled perspective view of the hinge device shown in FIG. 1.
Figure 3:
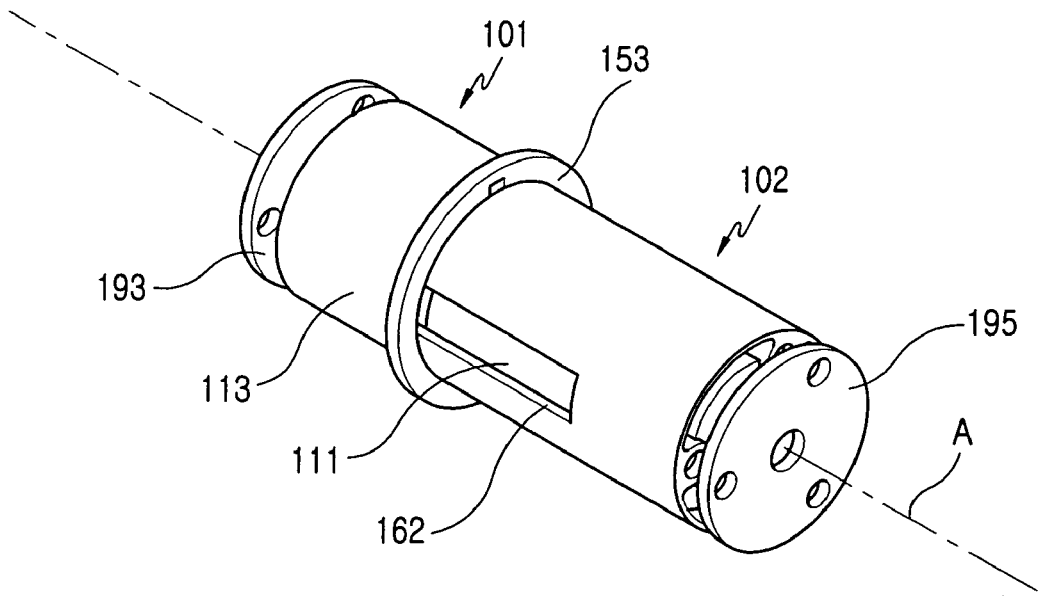
FIG. 3 is another assembled perspective view of the hinge device shown in FIG. 1 when seen from a different direction.

Referring to FIG. 3, the second hinge housing 102 has a cylindrical shape and is coupled to the first hinge housing 101 while enclosing the outer peripheral surface of the first hinge housing 101, particularly the outer peripheral surface of the first housing portion 111. The second hinge housing 112 has a second longitudinal slit 162 on the outer peripheral surface for communication between the interior and exterior of the second hinge housing. The second slit 162 extends to the end of the second hinge housing 102 and abuts the stepped surface 119 of the first hinge housing 101.

When the first and second hinge housings 101 and 102 are coupled to each other, the third slit 163 on the stepped surface 119 of the first hinge housing 101 causes the first slit 161 to communicate with the interior of the second hinge housing 102. As a result, the first and second slits 161 and 162 are connected to each other via the third slit 163.

Figure 6:
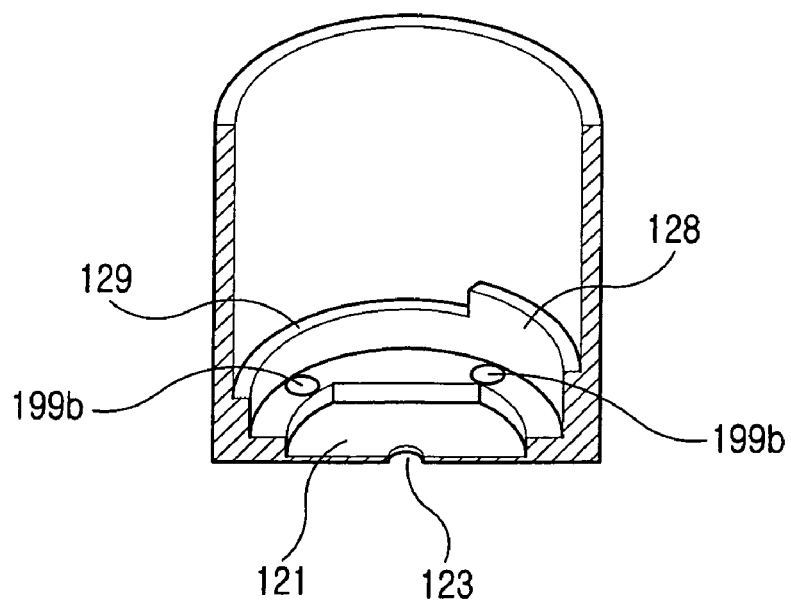
FIG. 6 is a partially-broken perspective view illustrating a second hinge housing of the hinge device shown in FIG. 1.

Referring to FIG. 6, the second hinge housing 102 has a fixing groove 121 recessed a predetermined depth from the inner end wall and fastening holes 123 and 199b in the inner end wall. At least one of the fastening holes 123 and 199b is in the fixing groove 121.

The second hinge housing 102 has a second stopper 128 on the inner wall near the inner end. The second stopper 128 extends a distance corresponding to a predetermined angular range in the circumferential direction. When the first and second housings 101 and 102 are coupled to each other, the first and second stoppers 114 and 128 interfere with each other and limit the range of rotation of the second hinge housing 102. In the present embodiment, the range of rotation of the second hinge housing 102 is limited to 180°. In other words, the sum of the angular span of the first and second stoppers 114 and 128 is 180°.

The second hinge housing 102 has a stepped surface 129 on the inner wall near the inner end that extends in the circumferential direction. The stepped surface 129 is at a different level than the second stopper 128. The stepped surface 129 extends along the circumference of the inner wall of the second housing 102, except for the angular span of the second stopper 128. When the first and second hinge housings 101 and 102 are coupled to each other, the first stopper 114 is positioned on the stepped surface 129. As the second hinge housing 102 rotates, the first stopper 114 slides on the stepped surface 129 and interferes with the second stopper 128. In this manner, the range of rotation of the second hinge housing 102 is limited.

As the first hinge housing 101 is inserted into the second hinge housing 102 in the longitudinal direction, the first housing portion 111 is enclosed by the second hinge housing 102. The second hinge housing is thus adapted to rotate about a hinge axis A extending in the longitudinal direction of the first hinge housing 101.

The hinge device 100 has a hinge shaft 103 to prevent the second hinge housing 102 from moving along the hinge axis A away from the first hinge housing 101.

The hinge shaft 103 is fixed to the end wall of the second hinge housing 102 by a screw 199c. The hinge shaft 103 has a fixing body 131 on a first end. The shape of the fixing body 131 corresponds to the shape of the fixing groove 121 on the end wall of the second hinge housing 102. The fixing body 131 is fixed by a fixing means (screw 199c) while the fixing body 131 is received in the fixing groove 121.

The hinge shaft 103 has a fastening groove 139 on the outer peripheral surface of the second end of the hinge shaft. The hinge shaft extends through the end wall of the first hinge housing 101 so that an E-ring 191 can be fastened to the fastening groove 139. As such, the hinge shaft 103 is rotatably coupled to the first hinge housing 101. In this manner, the second hinge housing 102 is rotatably coupled to the first hinge housing 101 while enclosing it and is prevented from linearly traveling by the hinge shaft 103.

Although not shown in the drawings, a washer may be interposed between the E-ring 199 and the end wall of the first hinge housing 101. The washer alleviates wear caused by friction between the E-ring 191 and the end wall of the first hinge housing 101 or the fastening groove 139 of the hinge shaft 103, when the hinge shaft 103 rotates relative to the first hinge housing 101.

The hinge device 100 has first and second hinge cams 104 and 132. An elastic member 151 provides a driving force in the direction of rotation or in the opposite direction, depending on the angle of rotation of the second hinge housing 102.

The first hinge cam 104 is received in the first hinge housing 101 in such a manner that it can move linearly. The first hinge cam 104 has at least one guide protrusion 142 on the outer peripheral surface, which engages the guide groove 112 in such a manner that it can move linearly therein. As such, the first hinge cam 104 can move linearly inside the first hinge housing 101. The first hinge cam 104 has at least one crest 141 on one end in the shape of a curved surface.

The second hinge cam 132 is received in the first hinge housing 101 in such a manner that it can rotate therein. More particularly, the second hinge cam 132 is fixed to the hinge shaft 103 and rotates together with it.

The hinge shaft 103 extends through the first hinge cam 104 and is rotatably coupled to the end wall of the first hinge housing 101. The first and second hinge cams 104 and 132 are assembled in such a manner that they face each other.

The second hinge cam 132 has at least one curved trough 133 on one surface, which engages the crest 141 of the first hinge cam 104 when the hinge shaft 103 rotates.

The elastic member 151 is positioned on the outer peripheral surface of the hinge shaft 103. One end of the elastic member 151 is supported on the inner end wall of the first hinge housing 101 and the other end is supported on the first hinge cam 104 to provide an elastic force in such a direction that the first and second hinge cams 104 and 132 are pressed together. When the hinge shaft 103 rotates while the first and second hinge cams 104 and 132 are forced against each other, a driving force is generated which tends to rotate the hinge shaft 103 in such a direction that the crest 141 and the trough 133 engage each other.

Preferably, the first and second hinge cams 104 and 132 are fabricated separately from the first and second hinge housings 101 and 102 and the hinge shaft 103. More particularly, the first and second hinge housings 101 and 102 and the hinge shaft 103 are made of a metallic material to impart structural stability and strength. The first and second hinge cams 104 and 132 are preferably made of a high-strength composite resin for smooth rotation and reduced noise generation, because they are in sliding contact while being pressed together by the elastic member 151 as the second hinge housing 102 rotates.

The hinge device 100 has fastening plates 193 and 195 and a support ring 153, which are used to couple the hinge device 100 to a terminal and will be described in detail together with a portable terminal.

Figure 7:
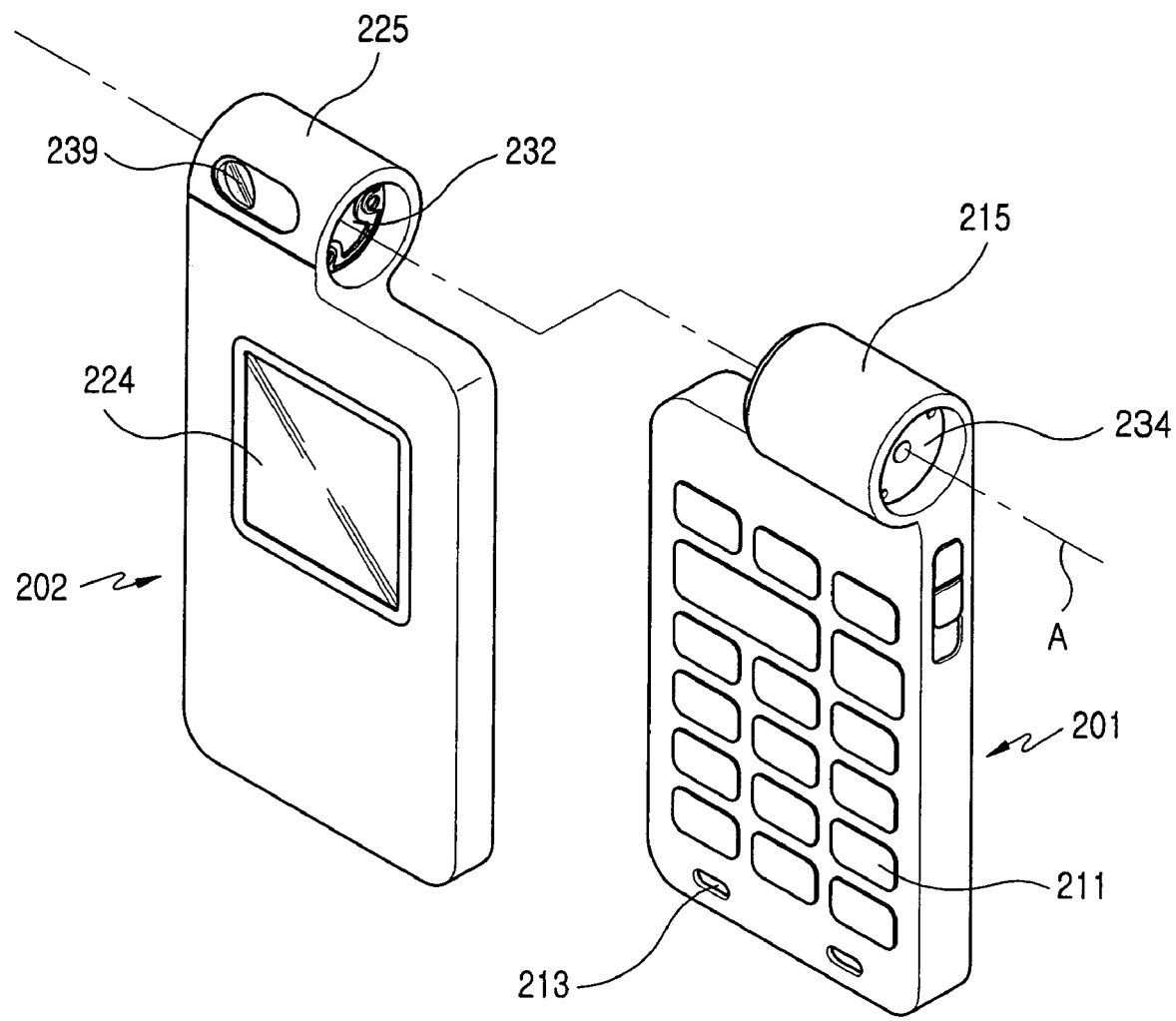
FIG. 7 is an exploded perspective illustrating a portable terminal having the hinge device shown in FIG. 1.
Figure 8:
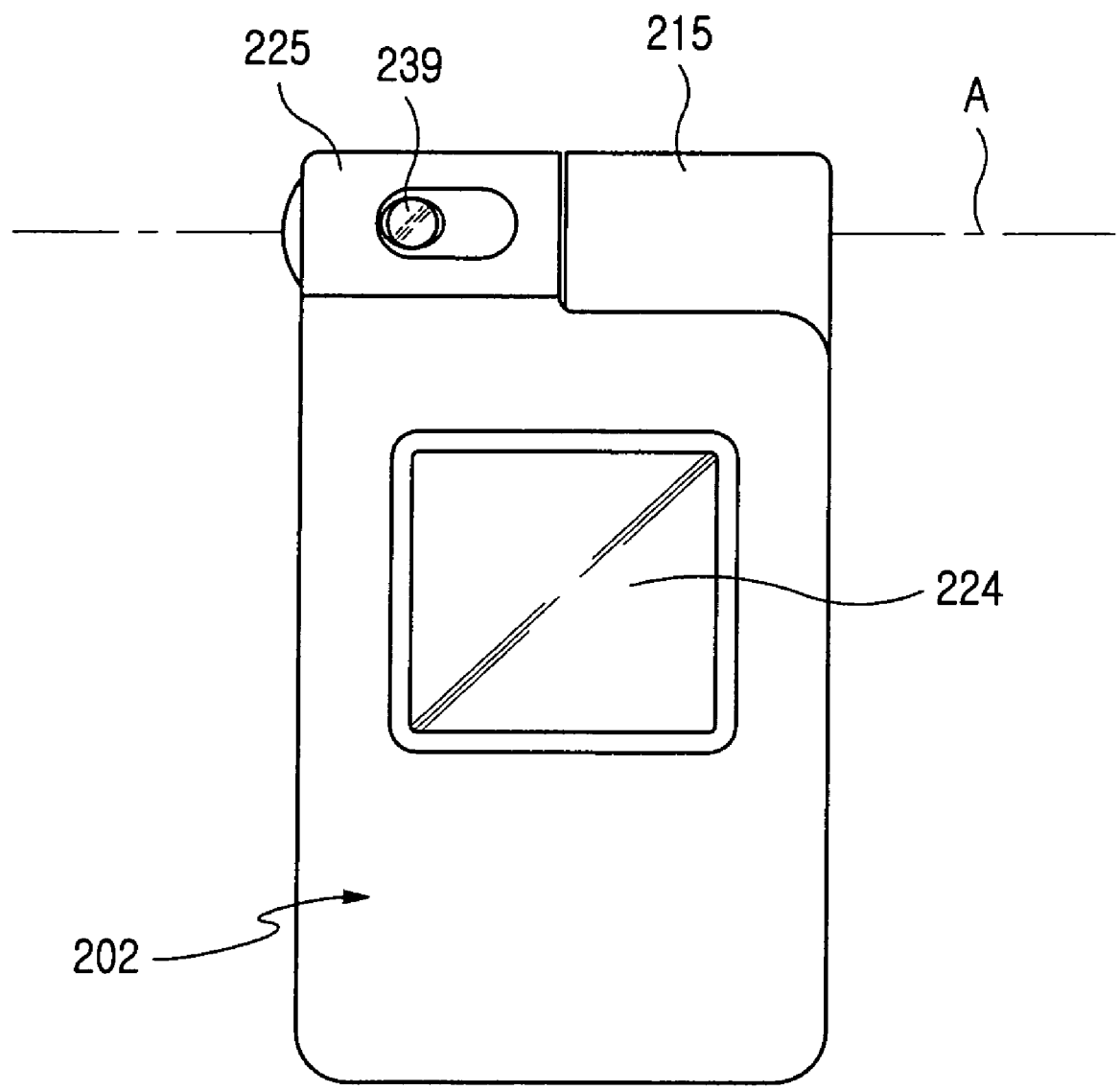
FIG. 8 is an assembled front view of the portable terminal illustrated in FIG. 7.

FIGS. 7 and 8 are perspective views showing a portable terminal 200 having the hinge device 100. As shown in FIGS. 7 and 8, the portable terminal 200 includes a first housing 201 and a second housing 202 adapted to fold or unfold by being rotated towards or away from the first housing 201 while facing it.

The first housing 201 has a keypad 211 and a transmitter unit 213 on the front surface and a first side hinge arm 215 on a side of the upper end. The second housing 202 has a main display device and a receiver unit (not shown) on the inner surface facing the front surface of the first housing 201, a sub display device 224 on the outer surface, and a second side hinge arm 225 on a side of the upper end while facing the end surface of the first side hinge arm 215.

The hinge device 100 is separately fixed to the first and second side hinge arms 215 and 225, which are coaxially arranged along the hinge axis A.

Figure 9:
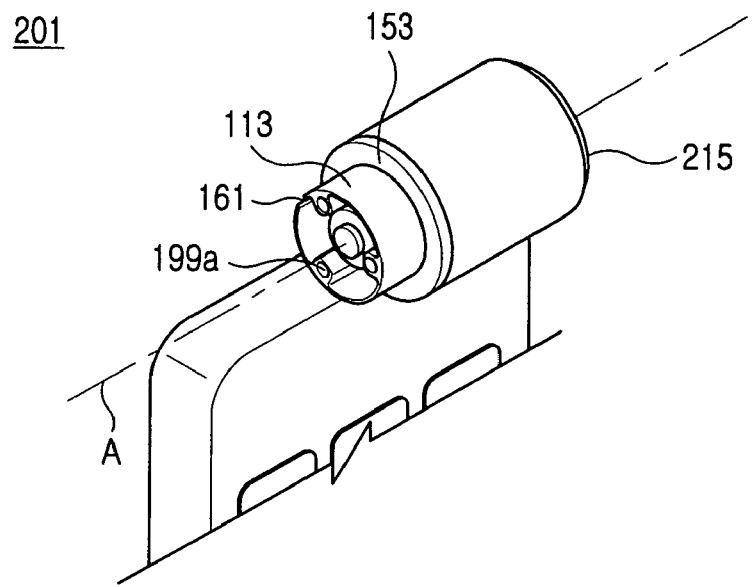
FIG. 9 is a perspective view showing the first housing of the portable terminal illustrated in FIG. 7, which is coupled to the hinge device.
Figure 10:
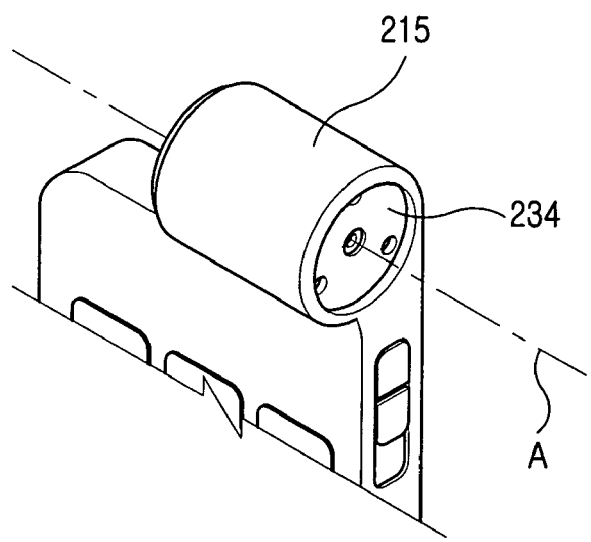
FIG. 10 is another perspective view showing the first housing of the portable terminal illustrated in FIG. 7, which is coupled to the hinge device, when seen from a different direction.

Referring to FIGS. 9 and 10, the first side hinge arm 215 has a first receiving hole (not shown) extending from an end surface facing the second side hinge arm 225 along the hinge axis A to receive the second hinge housing 102. A fastening groove 234 is on the other end surface. The fastening groove is coaxial to the first receiving hole and divided from it by a diaphragm.

The support ring 153 is coupled to an end of the second hinge housing 102, which abuts an end of the first side hinge arm 215. The fastening plate 195 is positioned in the fastening groove 234, to which a screw (not shown) is fastened. The screw is fixed to the second hinge housing 201 via the fastening plate 195 and the diaphragm inside the first side hinge arm 215. The fastening force of the screw is not concentrated on a specific point but is distributed over a large area via the fastening plate 195. The support ring 153 may have a support groove 159 (FIG. 1) on a surface of the ring and the second hinge housing 102 may have a support protrusion 158 on the outer peripheral surface of an end of the hinge housing, so that the support groove 159 and the support protrusion 158 engage each other and fix the support ring 153 to the second housing 102.

Figure 11:
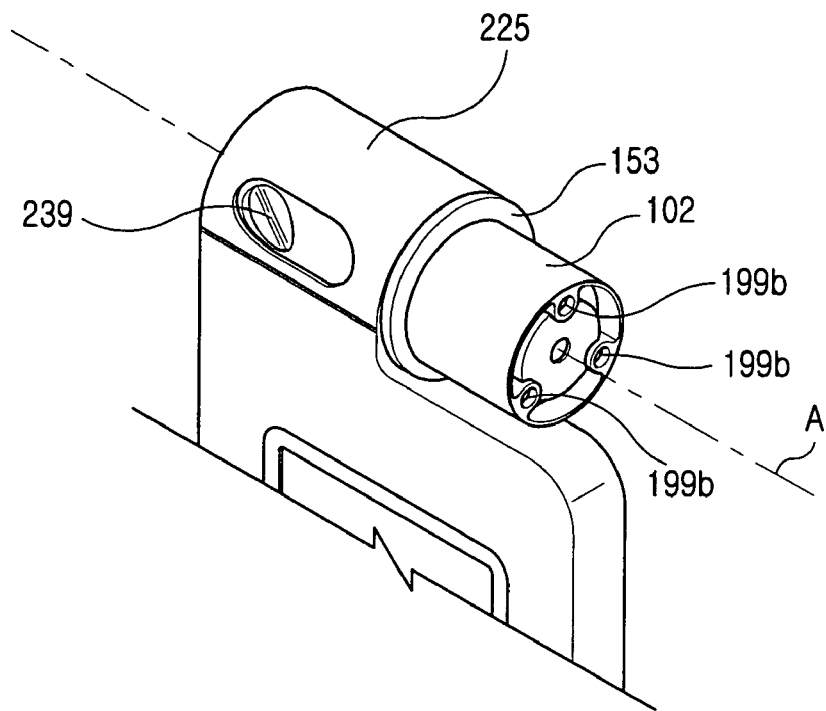
FIG. 11 is a perspective view showing the second housing of the portable terminal illustrated in FIG. 7, which is coupled to the hinge device.
Figure 12:
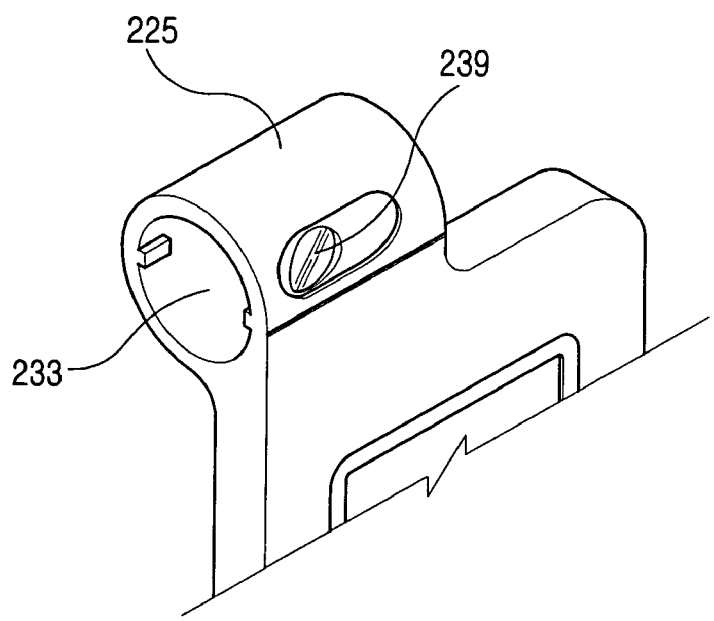
FIG. 12 is another perspective view showing the second housing of the portable terminal illustrated in FIG. 7, which is coupled to the hinge device, when seen from a different direction.

Referring to FIGS. 7, 11, and 12, the second side hinge arm 225 has a second receiving hole 232 extending from an end surface facing the first side hinge arm 215 along the hinge axis A and a third receiving hole 233 extending from the other end surface. The second and third receiving holes 232 and 233 are divided from each other by a diaphragm inside the second side hinge arm 225. The first hinge housing 101 of the hinge device 100 is received in the second receiving hole 232. The fastening plate 193 is coupled to the third receiving hole 233 in the same manner as the second hinge housing 102 is coupled to the first receiving hole 232. The first hinge housing 101 is fixed to the second receiving hole 232 by a screw.

When the hinge device 100 is separately coupled to the first and second side hinge arms 215 and 225, the support ring 153 is positioned between the first and second side hinge arms 215 and 225. As the second housing 202 rotates, the support ring 153 prevents direct friction between the first and second side hinge arms 215 and 225 and facilitates smooth rotation of the second housing 202.

Figure 4:
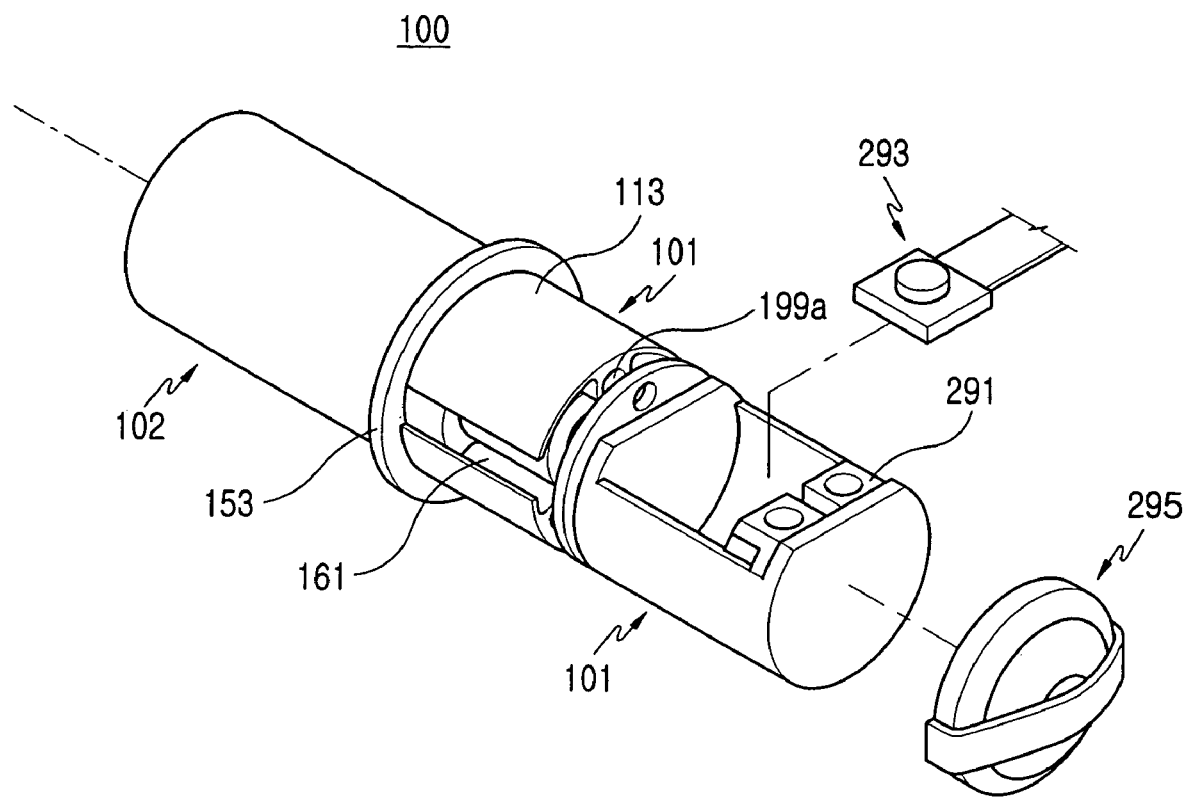
FIG. 4 is a perspective view illustrating a camera holder positioned adjacent to the hinge device shown in FIG. 1.

A camera holder 291 (shown in FIG. 4) is positioned in the third receiving hole 233. Referring to FIGS. 4 and 11, the second side hinge arm 225 has an exposure opening 239 and a camera device 293 is mounted on the camera holder 291. When the camera holder 291 is positioned in the third receiving hole 233, the camera device 293 can take pictures via the exposure opening 239. After the camera holder 291 is positioned in the third receiving hole 233, a hole cap 295 is mounted in the third receiving hole 233 to close it.

In the portable terminal 200 constructed as above, the second housing 202 folds or unfolds by being rotated towards or away from the first housing 201 and the range of rotation of the second housing 202 is limited by the first and second stoppers 114 and 128. In the present embodiment, the angular span of the first and second stoppers 114 and 128 is set to be 180° to limit the range of rotation of the second housing 202 to 180° or less. However, it can be easily understood by those skilled in the art that the angular span of the first and second stoppers 114 and 128 can be set to different ranges of rotation of the second housing 202.

The first to third slits 161-163 provide a passage through which a flexible printed circuit (not shown) passes to electrically connect circuit devices positioned in the first housing 201 to those in the second housing 202. Particularly, the first and second slits 161 and 162 are connected to the interior of the second and first housings 202 and 201, respectively, to provide a passage through which a flexible printed circuit can pass.

Figure 13:
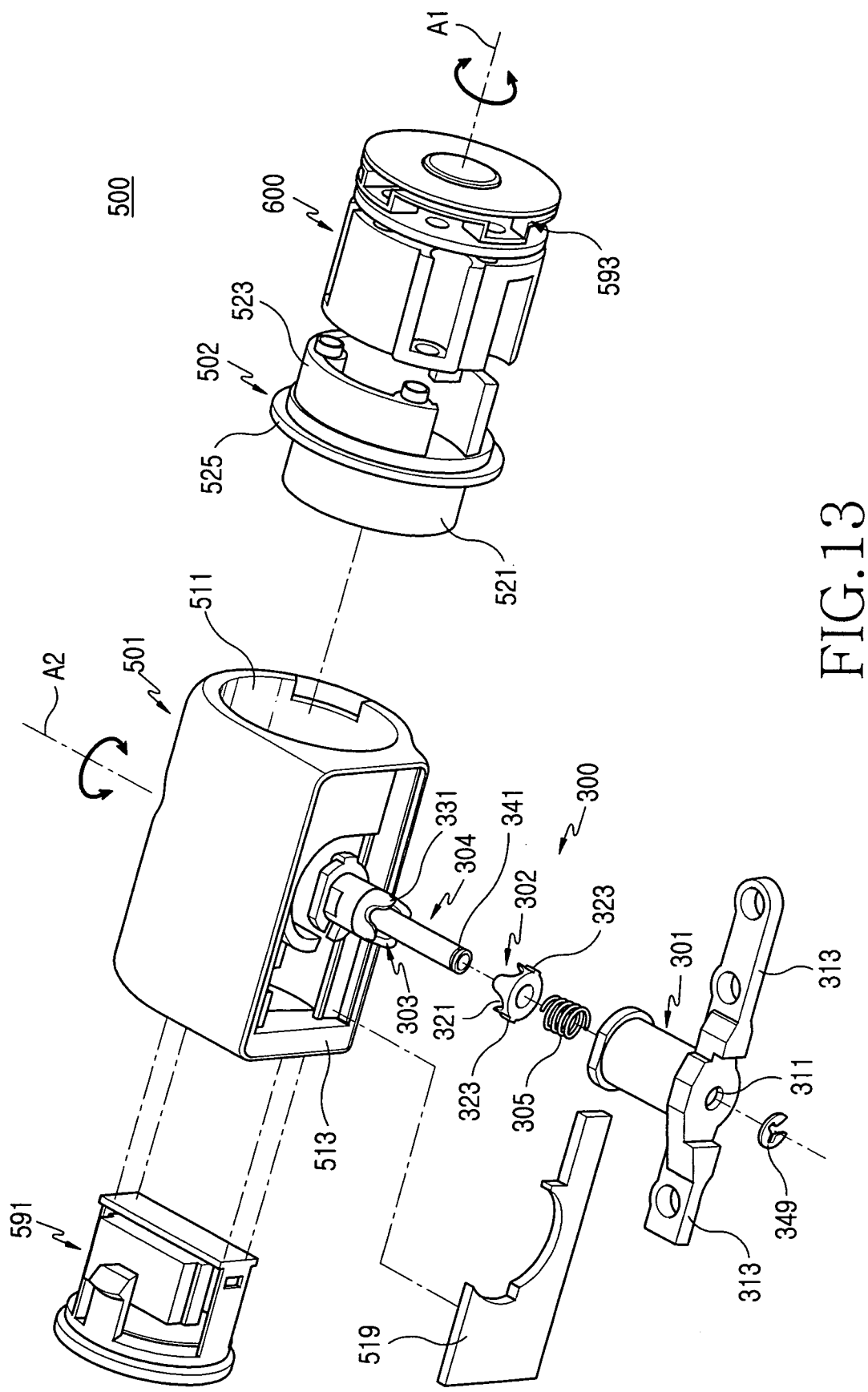
FIG. 13 is an exploded perspective view showing a hinge device for a portable terminal according to another embodiment of the present invention.
Figure 14:
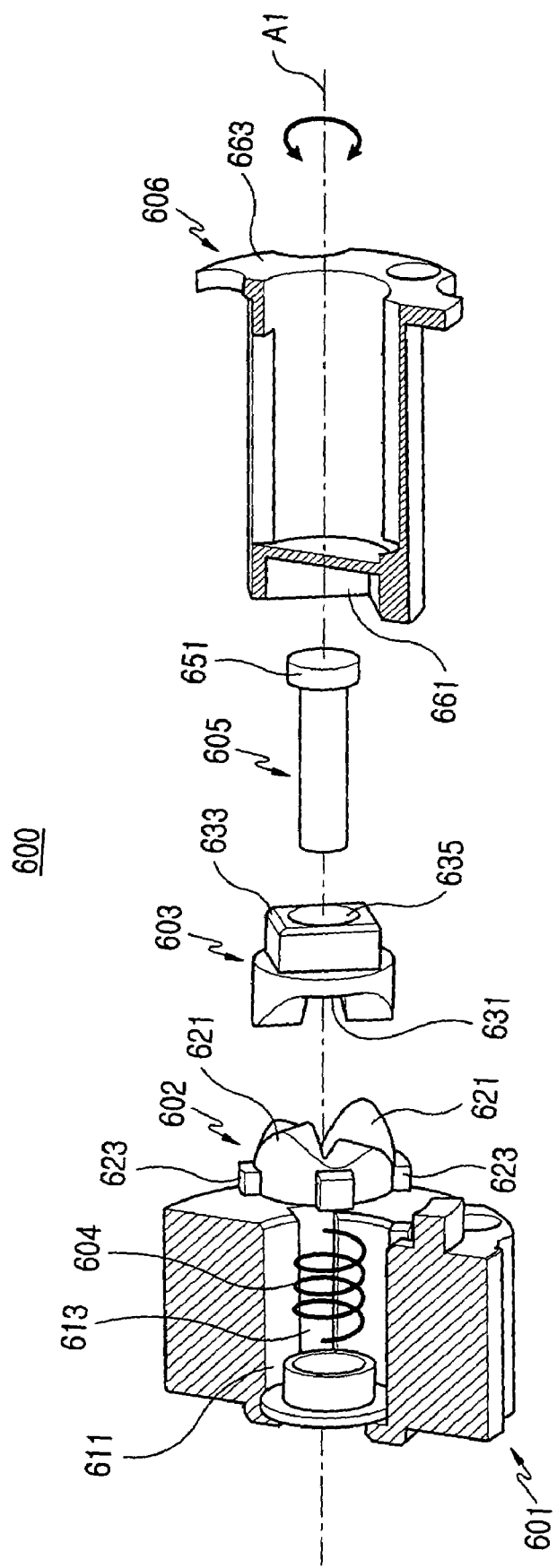
FIG. 14 is a partially-broken exploded perspective view illustrating the first hinge module of the hinge device shown in FIG. 13.
Figure 15:
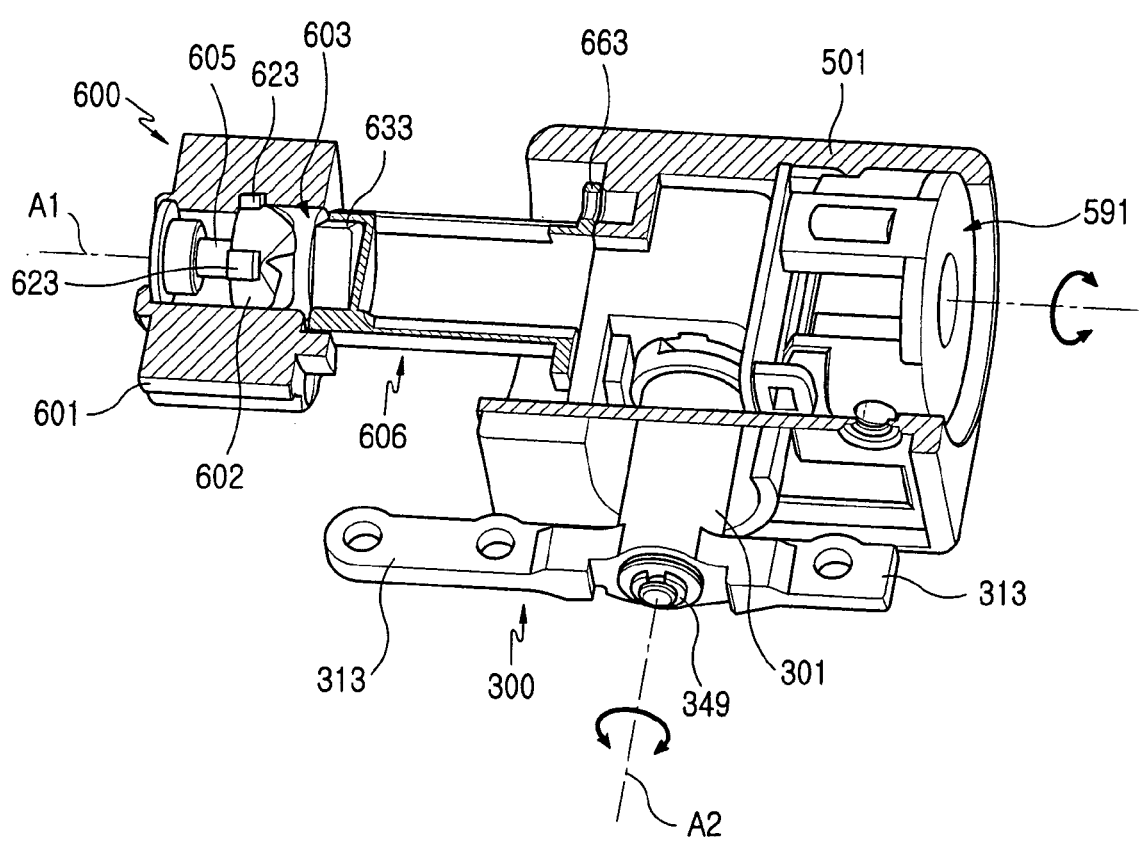
FIG. 15 is a partially-broken assembled perspective view of the hinge device shown in FIG. 13.

As shown in FIGS. 13 to 15, a hinge device 500 for a portable terminal 400 (shown in FIG. 18) according to another embodiment of the present invention includes a hinge housing 501, a coupling housing 502, and first and second hinge modules 600 and 300. The hinge housing 501 is adapted to rotate about a hinge axis A1. In contrast to the previous embodiment, the second hinge module 300 has a rotary shaft 301 adapted to rotate about a second hinge axis A2 extending in a direction substantially perpendicular to the first hinge axis A1.

The hinge housing 501 is cylindrical and extends along the first hinge axis A1. The first hinge axis is positioned at the center of the hinge housing. The hinge housing 501 has a rotation hole 511 on the inner end, which the coupling housing 502 is rotatably coupled to, and a planar outer peripheral surface 513 on one side. The outer peripheral surface 513 is exposed for easy assembly when the second hinge module 300 or another auxiliary device 591 is installed and then covered by a cover plate 519 after installation.

The auxiliary device 591 is coupled to the outer end of the hinge housing 501 and includes a camera module and a speaker device.

The coupling housing 502 is cylindrical and extends along the first hinge axis A1. An end 521 of the coupling housing 502 is rotatably coupled to the rotation hole 511 of the hinge housing 501. A coupling ring 525 is fixed to the inner end of the hinge housing 501, when the end 521 of the coupling housing 502 is rotatably coupled to the hinge housing 501, to support the rotation of the coupling housing 502 and prevent the hinge housing 501 and the coupling housing 502 from separating from each other.

The first hinge module 600 is fixedly coupled to the other end 523 of the coupling housing 502. As the hinge housing 501 rotates, the first hinge module 600 provides a rotational force acting in the direction of rotation or in the opposite direction.

Referring to FIG. 14, the first hinge module 600 has a module housing 601, a hinge cam 602, and a hinge shaft 603. The hinge cam 602 and the hinge shaft 603 are constrained in the module housing 601 by a hinge pin 605.

The module housing 601 has a hinge hole 611 extending along the first hinge axis A1. The hinge cam 602 and the hinge shaft 603 are received in the hinge hole 611. One end of the hinge hole 611 is open and the other end is closed so that an end of the hinge pin 605 is fixed to the end wall of the hinge hole 611. The hinge hole 611 has at least one guide groove 613 on the inner wall that extends along the first hinge axis A1. The module housing 601 is fixed to one of a pair of housings constituting a portable terminal. Hereinafter, the housing of the portable terminal to which the module housing 601 is fixed will be referred to as a "first housing."

The hinge cam 602 is received in the hinge hole 611 in such a manner that it can move linearly. The hinge cam 602 has a guide protrusion 623 on the outer peripheral surface, which engages the guide groove 613 on the inner wall of the hinge hole 611 so that the hinge cam 602 can move linearly in the module housing 601. The hinge cam 602 has a number of crests 621 on one end so that it has a curved surface.

The hinge shaft 603 is coupled to the hinge hole 611 in such a manner that it can rotate therein. The hinge shaft 603 has troughs 631 on one end so that it has a curved surface. The troughs 631 are adapted to face the crests 621 of the hinge cam 602. The other end of the hinge shaft 603 protrudes towards the exterior of the module housing 601.

An elastic member 604 is positioned between the end wall of the hinge hole 611 and the hinge cam 602 to provide an elastic force in such a direction that the hinge cam 602 and the hinge shaft 603 are forced against each other. When the crests 621 and the troughs 632 engage each other, therefore, the hinge shaft 603 does not rotate and remains stationary. If the hinge shaft 603 is rotated about the first hinge axis A1 by an external force, the crests 621 and the troughs 631 disengage each other. The elastic force supplied to the hinge cam 602 is then converted into a rotational force acting in such a direction that the crests 621 and the troughs 631 again engage each other. Particularly, a rotational force is generated opposite to the direction of rotation of the hinge shaft 603. If the hinge shaft 603 is rotated further and the crests 621 are positioned on different slant surfaces of the troughs 631, the elastic force from the elastic member 604 is converted into a rotational force acting in the direction of rotation of the hinge shaft 603.

The hinge pin 605 extends through the hinge shaft 603, the hinge cam 602, and the elastic member 604. The hinge pin 605 supports an end of the hinge shaft 603 and is fixed to the end wall of the hinge hole 611. Therefore, the hinge shaft 603 is constrained to the module housing 601 without traveling along the first hinge axis A1. The hinge shaft 603 is rotatably coupled to the hinge pin 605. The hinge cam 602 is coupled to the hinge pin 605 so that it can move linearly.

The hinge pin 605 has a support body 651 on one end. The support body 651 has a circular sectional shape. The hinge shaft 603 has a support hole 635 on its end surface in a shape that corresponds to that of the support body 651, so that the hinge shaft 603 is rotatably supported without traveling away from the module housing 601.

The rotational force generated by the first hinge module 600 is transmitted to the hinge housing 501 via a driving shaft 606. The driving shaft 606 extends along the first hinge axis A1 and has a shaft groove 661 on a first end and a flange 663 on a second end. The end of the hinge shaft 603 is received in the shaft groove 661, and the hinge housing 501 is coupled to the flange 663. The flange 663 is fixed to the end wall of the rotation hole 511 and rotates together with the hinge housing 501. The other end 633 of the hinge shaft 603 has the shape of a square post, and the shape of the shaft groove 661 corresponds to the shape of the other 633 end of the hinge shaft. Therefore, the hinge shaft 603 and the driving shaft 606 constrain each other in the direction of rotation of the hinge shaft 603. As a result, the hinge housing 501, the driving shaft 606, and the hinge shaft 603 rotate together about the first hinge axis A1.

As mentioned above, the second hinge module 300 has a rotary shaft 301 coupled to the hinge housing 501 and adapted to rotate about the second hinge axis A2. The second hinge module 300 includes first and second rotary cams 302 and 303 and a support shaft 304, which are received in the rotary shaft 301.

The rotary shaft 301 is cylindrical and extends along the second hinge axis A2. The rotary shaft 301 has a pair of fastening arms 313 on the outer peripheral surface of one end. The fastening arms 313 extend away from each other. The fastening arms 313 are used to fix the rotary shaft 301 to the other of the pair of housings constituting the portable terminal. Hereinafter, the other housing of the portable terminal to which the rotary shaft 301 is fixed by the fastening arms 313 will be referred to as a "second housing."

The first rotary cam 302 has a trough 321 on one end and the second rotary cam 303 has a crest 331 on one end. The crest 331 faces the trough 321. The first rotary cam 302 has at least one guide protrusion 323 on its outer peripheral surface. The rotary shaft 302 has a guide groove (not shown) on its inner peripheral surface. The guide groove extends along the second hinge axis A2 and engages the guide protrusion 323 of the first rotary cam 302. As the guide protrusion 323 and the guide groove engage each other, the first rotary cam 302 is adapted to move linearly inside the rotary shaft 301. Thus, at least in this respect, rotary shaft 301 is similar to first hinge housing 101.

The support shaft 304 extends through the rotary shaft 301 along the second hinge axis A2. An end of the support shaft 304 protrudes to the exterior via a through-hole 311 located in an end of the rotary shaft 301. The support shaft 304 has a fastening groove 341 on the outer peripheral surface of the end, to which an E-ring 349 is fastened after the end protrudes via the through-hole 311 of the rotary shaft 301. As such, the support shaft 304 is rotatably coupled to the rotary shaft 301. A washer may be interposed between the E-ring 349 and the outer peripheral surface of the end of the rotary shaft 301.

The support shaft 304 extends through the first and second rotary cams 302 and 303. The first rotary cam 302 is adapted to move linearly on the support shaft 304 while the second rotary cam 303 is fixed to the support shaft 304. As the rotary shaft 301 rotates, the first and second rotary cams 302 and 303 rotate relative to each other while facing each other.

An elastic member 305 is positioned inside the rotary shaft 301 and is supported on the inner wall of an end of the rotary shaft 301 to provide an elastic force acting in such a direction that the first rotary cam 302 is forced against the second rotary cam 303.

As the rotary shaft 301 rotates, the second hinge module 300 generates a rotational force in the direction of rotation or in the opposite direction due to the construction of the trough 321 and the crest 331 of the first and second rotary cams 302 and 303, respectively. This can be easily understood by those skilled in the art from the previous description of operation of the hinge device 100 and the first hinge module 600, and will not be repeated here for conciseness.

Figure 17:
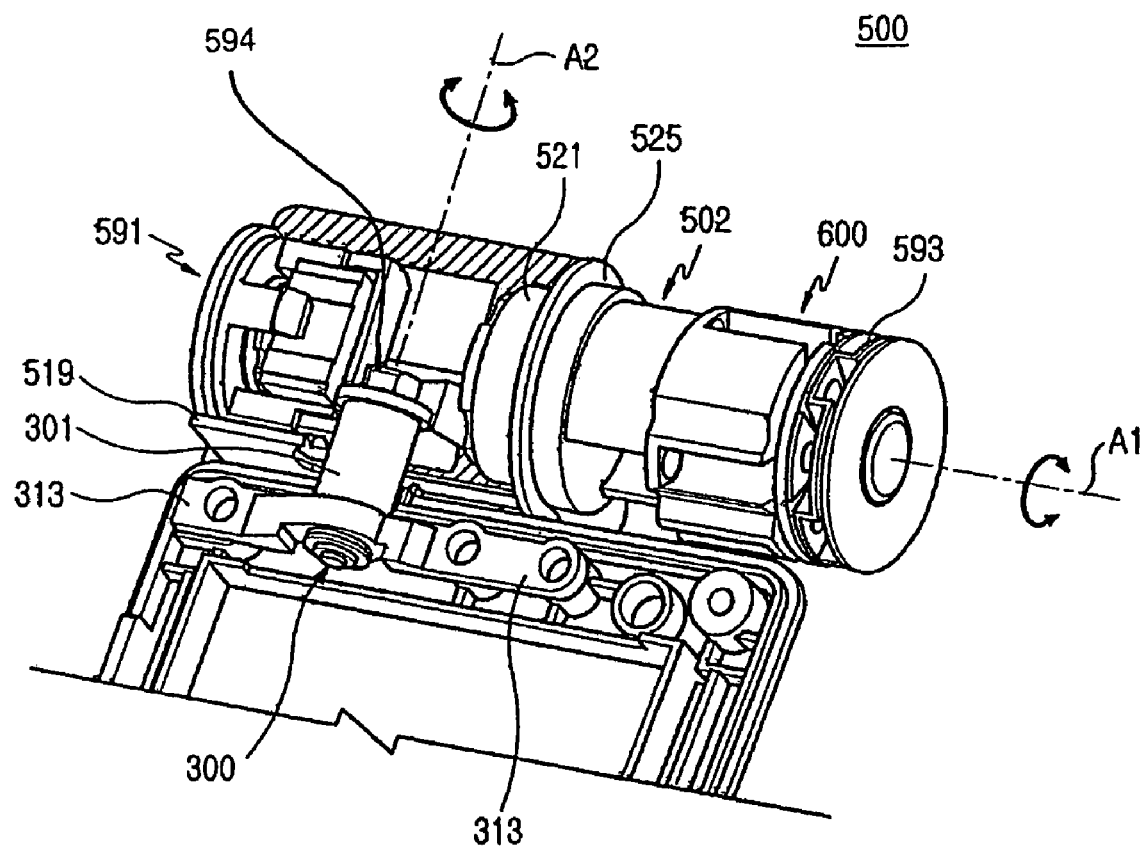
FIG. 17 is a partially-broken perspective view of the hinge device shown in FIG. 13.

The support shaft 304 is fixed to the inner wall of the hinge housing 501 and fixes the second hinge module 300 to the hinge housing 501 (and thus, at least in this respect, hinge housing 501 is similar to second hinge housing 102). According to one embodiment, for example, as shown in FIG. 17, the support shaft 304 is fixed to the inner wall of the hinge housing 501 by fixing body 594. As a result of the second hinge module 300 being fixed to the hinge housing 501, an end of the rotary shaft 301 protrudes from the outer peripheral surface 513 of the hinge housing 501 and the fastening arms 313 can be coupled to the second housing of the terminal.

Figure 16:
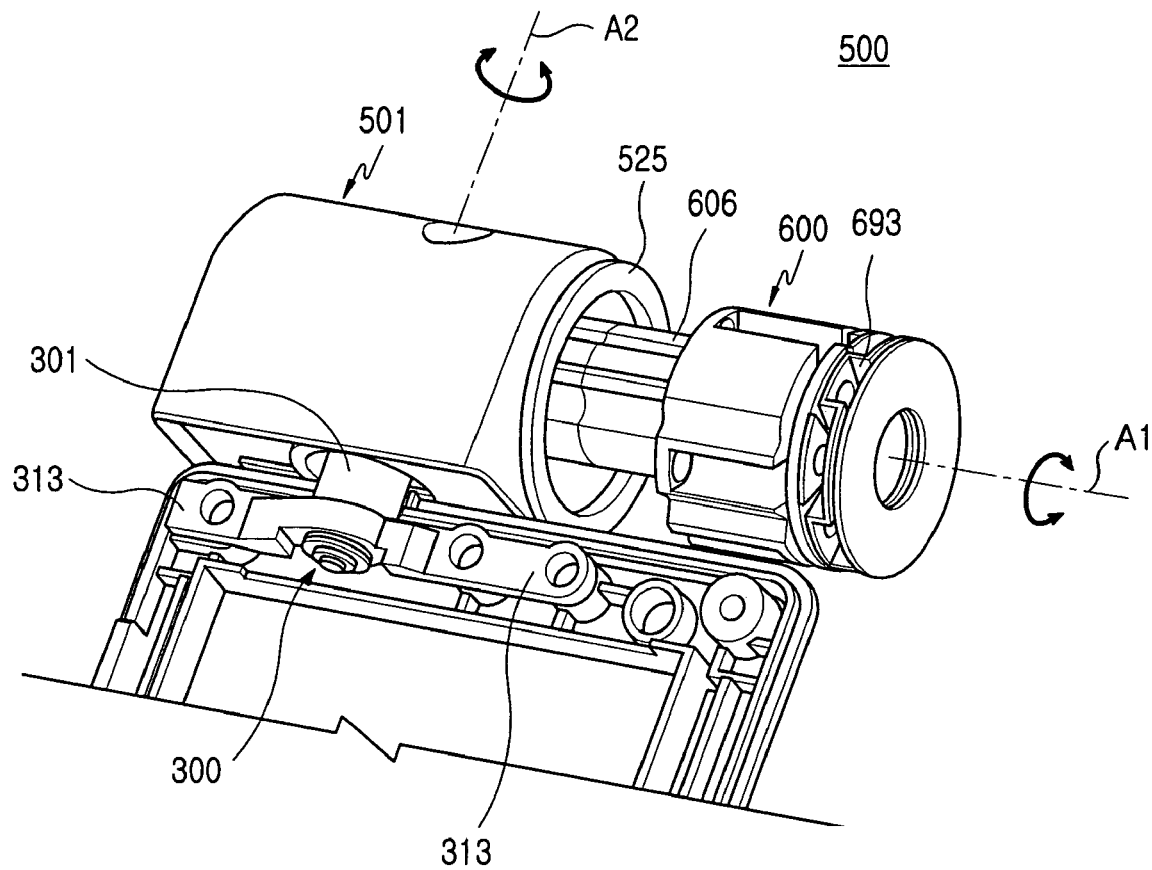
FIG. 16 is a perspective view of the hinge device shown in FIG. 13 when coupled to the second housing of the terminal.

As shown in FIGS. 16 and 17, the fastening arms 313 of the rotary shaft 301 are positioned on the inner surface of the second housing 402 and are fixed by a fixing means, such as welding, thermal bonding, or screws. Preferably, the fastening arms 313 are fastened, detachably, by screws, so that damaged components can be replaced.

When the hinge device 500 is assembled, the outer end 593 of the first hinge module 600 and the outer end of the hinge housing 501 constitute both ends of the hinge device 500. When the auxiliary device 591 is a camera, a shutter switch may be positioned on the outer end 593 of the first hinge module 600. When the auxiliary device 591 is a speaker device, another speaker device may be positioned on the outer end 593 of the first hinge module 600 to provide stereoscopic sound.

Figure 18:
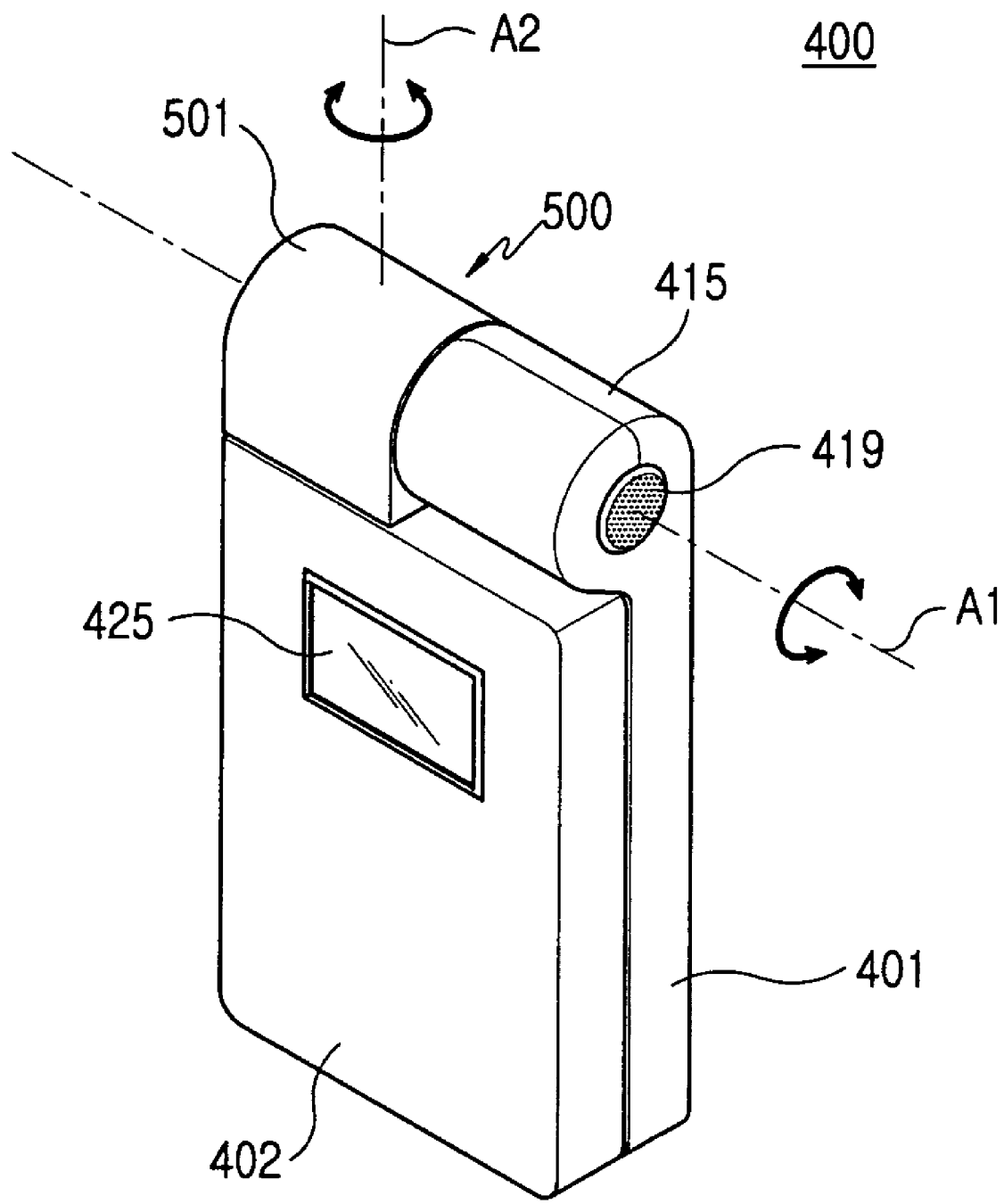
FIG. 18 is a perspective view illustrating a portable terminal having the hinge device shown in FIG. 13.
Figure 19:
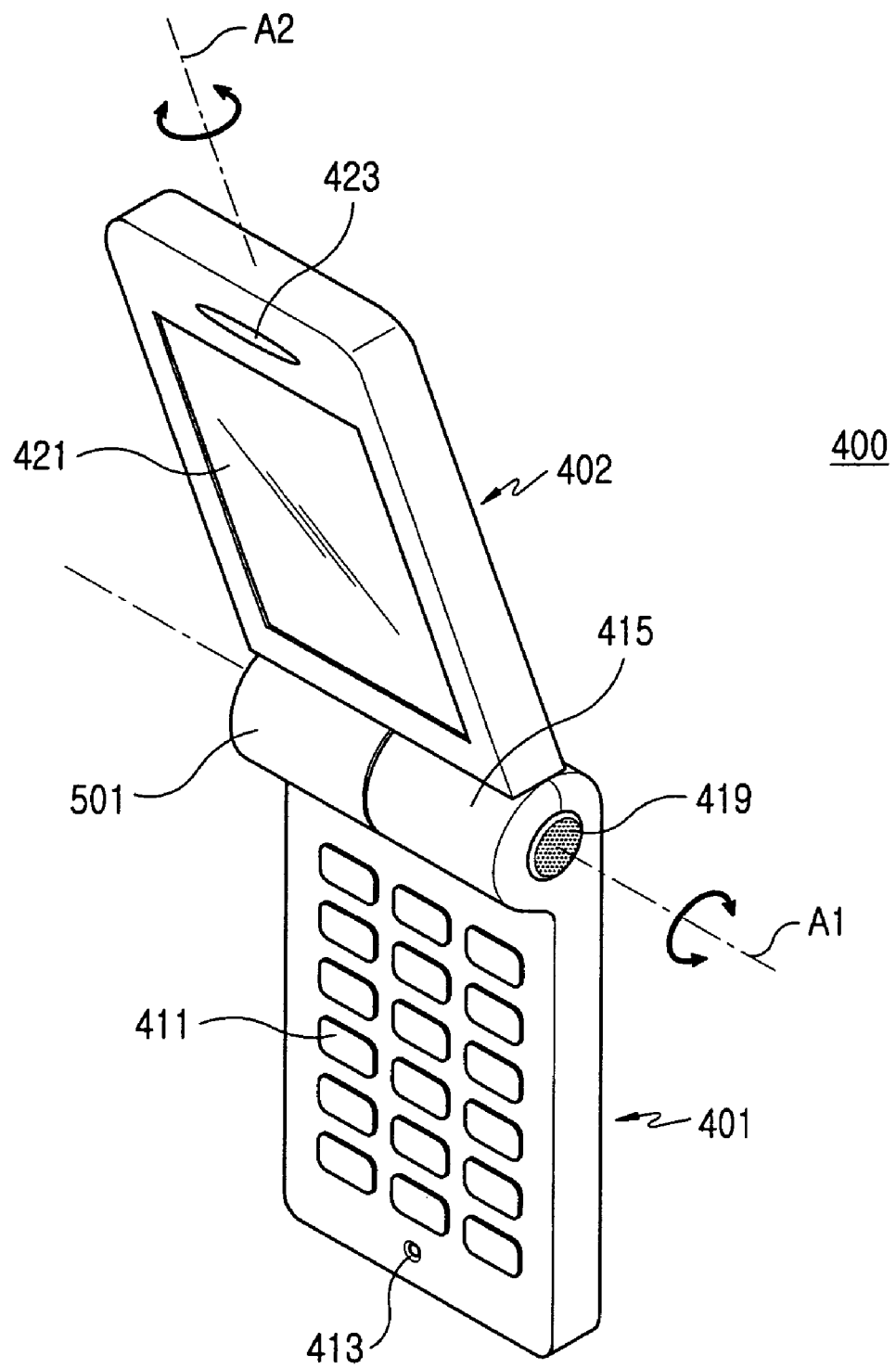
FIG. 19 is a perspective view showing the second housing of the portable terminal illustrated in FIG. 18, which is rotated about a first hinge axis to unfold.
Figure 20:
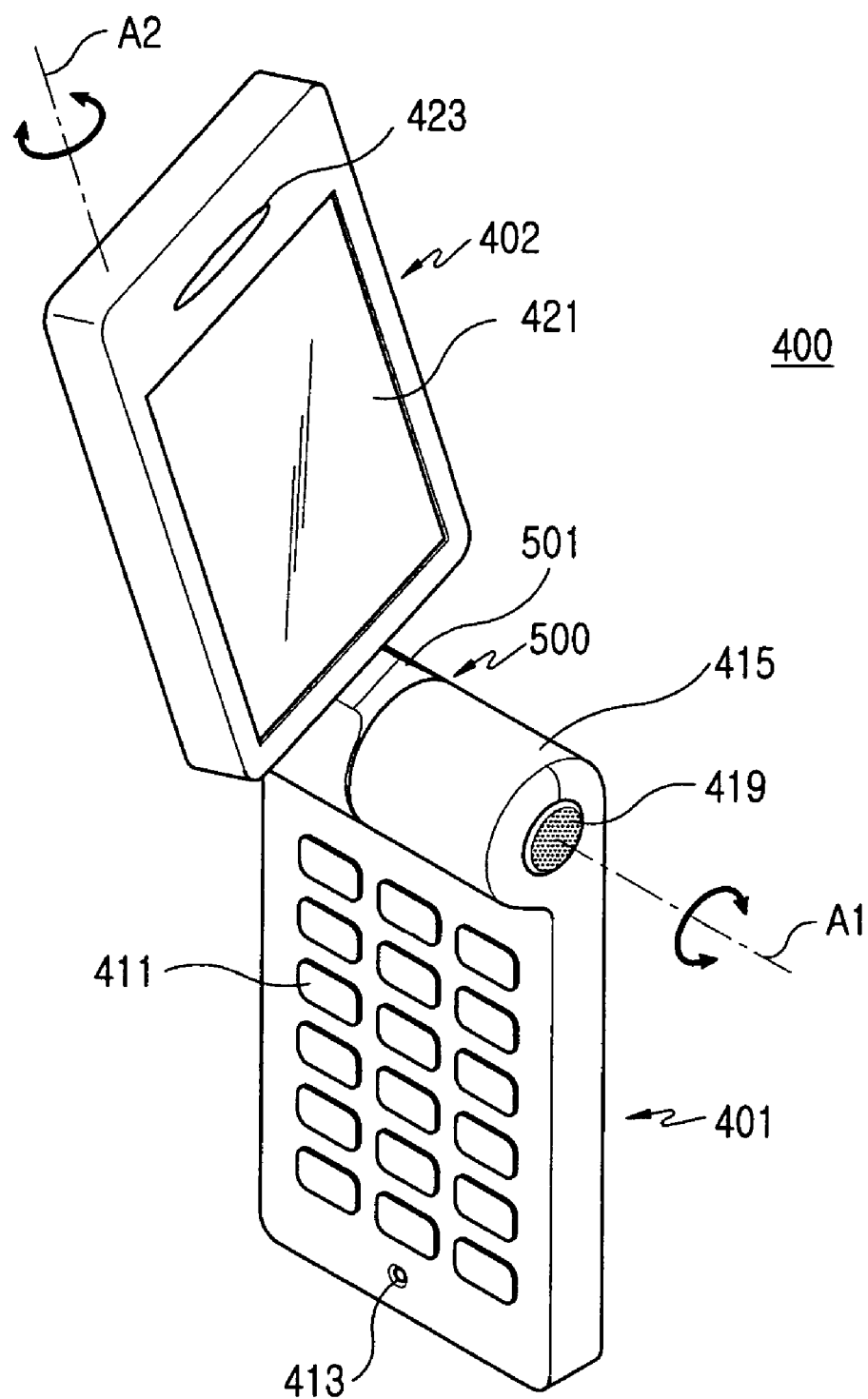
FIG. 20 is a perspective view showing the second housing of the portable terminal illustrated in FIG. 18, which is rotated about a second hinge axis.

The portable terminal 400 having the hinge device 500 constructed as above is shown in FIGS. 18 to 20.

As shown in FIGS. 18 to 20, the portable terminal 400 includes first and second housings 401 and 402 rotatably coupled to each other by the hinge device 500. The second housing 402 is adapted to rotate and unfold away from the first housing 401.

The first housing 401 has a keypad 411 and a transmitter unit 413 positioned on the front surface. A side hinge arm 415 is positioned on a side of the upper end. The side hinge arm 415 extends along the first hinge axis A1. The outer end of the side hinge arm 415 is flush with a lateral surface of the first housing 401. The shutter switch or speaker device positioned on the outer end 593 of the first hinge module 600 is exposed to the outer end 419 of the side hinge arm 415.

The first hinge module 600 of the hinge device 500 is fixedly installed inside the side hinge arm 415. In particular, the first hinge module 600 is fixed to the first housing 401. As the first hinge module 600 is fixed inside the side hinge arm 415, the inner end of the hinge housing 501 is coupled to the inner end of the side hinge arm 415 while facing it. One end of the coupling housing 502 is rotatably coupled to the hinge housing 501 and the other end is coupled to the inner end of the side hinge arm 415 while being fixed to the first hinge module 600. Therefore, the side hinge arm 415, the coupling housing 502, and the hinge housing 501 are arranged along the first hinge axis A1. The rotational force generated by the first hinge module 600 rotates the hinge housing 501 relative to the first housing 401.

The rotary shaft 301 protrudes from the outer peripheral surface 513 of a side of the hinge housing 501 and is coupled to the second housing 402, as mentioned above. As a result, the hinge housing 501 also acts as a side hinge arm on the second housing 402. The rotational force generated by the first hinge module 600 rotates the hinge housing 501, so that the second housing 402 is rotated towards or away from the first housing 401.

The outer end of the hinge housing 501 is flush with the other lateral surface of the second housing 402 so that an auxiliary device, such as a camera module or speaker device, can be positioned on the outer end of the hinge housing 501.

The second housing 402 has a display device 421 and a receiver unit 423 positioned on a surface facing the first housing 401 and is coupled to the hinge housing 501 via the rotary shaft 301. Therefore, the second housing 402 can rotate about the first hinge axis A1, as well as about the second hinge axis A2.

As the rotary shaft 301 is fixed to the inner surface of the second housing 402, the second housing 402 is adapted to rotate about the second hinge axis A2 relative to the hinge housing 501. It is obvious to those skilled in the art that the second housing 402 can rotate about the second hinge axis A2 only when positioned away from the first housing 401.

As the second housing 402 is adapted to rotate about the second hinge axis A2 only when positioned away from the first housing 401, the front and rear surfaces of the second housing 402 can be reversed and the display device 421 can display a screen along the first hinge axis A1 if necessary.

When the auxiliary device 591 is a camera module, the direction of photographing may be directed along the first hinge axis A1. The user can orient the display device 421 along the first hinge axis A1 opposite to the direction of photographing of the camera module for convenient photographing.

As mentioned above, the portable terminal according to the present invention has a side hinge arm positioned on each housing and coupled together by a hinge device, instead of a pair of side hinge arms positioned on the ends of one housing and a center hinge arm positioned on the second housing. This construction makes assembly easy and contributes to diversification of terminal design. The second housing can rotate about the second hinge axis when positioned away from the first housing so that the front and rear surfaces of the second housing can be reversed and the display device can be directed in the lateral direction. This diversifies the design of the terminal and allows the possibility of installing an auxiliary device, such as a camera module.

While the invention has been shown and described with reference to certain embodiments thereof, it will be understood by those skilled in the art that various changes in form and details may be made therein without departing from the spirit and scope of the invention as defined by the appended claims.

What is claimed is:

1. A portable terminal comprising:
   a first housing having a first side hinge arm formed on one side;
   a second housing having a second side hinge arm formed on the side of the second housing that faces the end of the first side hinge arm, the second housing rotating towards or away from the first housing to be folded or unfolded; and
   a hinge device rotatably coupling the first housing and the second housing,
   wherein the hinge device comprises:
   a first hinge housing fixed to the second side hinge arm;
   a hinge shaft rotatably coupled to the first hinge housing; and
   a second hinge housing fixed to the first side hinge arm and the hinge shaft while enclosing the outer peripheral surface of the first hinge housing.

2. The portable terminal as claimed in claim 1, wherein the hinge device further comprises:
   a support ring coupled to an end of the second hinge housing, the support ring protruding from the outer peripheral surface of the second hinge housing in the radial direction, the support ring being interposed between the first and second side hinge arms.

3. The portable terminal as claimed in claim 1, wherein
   the first side hinge arm has a first receiving hole to receive the second hinge housing, and
   the second side hinge arm has a second receiving hole that faces the first receiving hole to receive the first hinge housing.

4. The portable terminal as claimed in claim 1, further comprising:
   a camera lens positioned in a receiving hole located in the second side hinge arm; and
   a hole cap coupled to the second side hinge arm to close the third receiving hole.

5. The portable terminal as claimed in claim 1, wherein
   the second side hinge arm has an exposure opening and a camera lens positioned inside the second side hinge arm to take pictures via the exposure opening.

6. The portable terminal as claimed in claim 1, wherein the hinge device further comprises:
   a first hinge cam received in the first hinge housing in such a manner that it can move linearly therein and rotatably coupled to the hinge shaft; and
   a second hinge cam fixed to the hinge shaft and adapted to face the first hinge cam while making sliding contact with it.

7. The portable terminal as claimed in claim 1, wherein
   the first hinge housing has a first stopper formed on the outer peripheral surface that extends a distance corresponding to a predetermined angular range in the circumferential direction; and
   the second hinge housing has a second stopper formed on the inner peripheral surface that extends a distance corresponding to a predetermined angular range in the circumferential direction, the range of movement of the second stopper being limited by the first stopper to limit the range of rotation of the second housing.

8. The portable terminal as claimed in claim 1, wherein the first hinge housing comprises:
   a first housing portion enclosed by the second hinge housing; and
   a second housing portion extending at a level different from that of the first housing portion and having an outer peripheral surface adapted to be flush with the outer peripheral surface of the second housing when the second housing is coupled thereto, the first and second housing portions forming a stepped surface therebetween.

9. The portable terminal as claimed in claim 8, wherein
   the second housing portion has a first longitudinally extending slit on its outer peripheral surface,
   the second hinge housing has a second longitudinally extending slit, and the stepped surface between the first and second housing portions has a third slit that connects the first slit to the interior of the second hinge housing so that a passage is provided along which a flexible printed circuit extends from the first housing to the second housing.

10. The portable terminal as claimed in claim 1, wherein the hinge device further comprises:
   a first hinge cam received in the first hinge housing so that it can move linearly in the longitudinal direction; and
   a second hinge cam disposed on the hinge shaft to provide camming in association with the first hinge cam;
   wherein the hinge shaft extends through the first hinge cam in the longitudinal direction and is rotatably coupled to the first hinge housing; and
   the second hinge housing is fixed to the hinge shaft and is adapted to rotate relative to the first hinge housing, the second hinge housing enclosing the first hinge housing.

11. The portable terminal as claimed in claim 10, wherein the first hinge housing has at least one longitudinal guide groove on its inner peripheral surface, and
   the first hinge cam has at least one guide protrusion on its outer peripheral surface to engage the guide groove in such a manner that it can move linearly therein.

12. The portable terminal as claimed in claim 10, wherein the hinge shaft has a fixing body on one end of the hinge shaft, the fixing body being fixed to the second hinge housing, and
   the second hinge cam being fixed to the hinge shaft facing the first hinge cam.

13. The portable terminal as claimed in claim 12, wherein the hinge device further comprises:
   an elastic member disposed on an outer peripheral surface of the hinge shaft, a first end of the elastic member being supported on an inner wall of the first hinge housing, and an opposing end being supported on the first hinge cam to provide an elastic force acting in such a direction that the first hinge cam is forced against the second hinge cam.

14. The portable terminal as claimed in claim 12, wherein the first hinge cam has at least one curved crest, and
   the second hinge cam has at least one curved trough to engage the curved crest.

15. The portable terminal as claimed in claim 10, wherein the first hinge housing has a first stopper on its outer peripheral surface, the first stopper extending a distance corresponding to a predetermined angular range in the circumferential direction, and
   the second hinge housing has a second stopper on its inner peripheral surface, the second stopper extending a distance corresponding to a predetermined angular range in the circumferential direction, the range of movement of the second stopper being limited by the first stopper.

16. The portable terminal as claimed in claim 15, wherein the sum of angular span of the first and second stoppers is 180°.

17. The portable terminal as claimed in claim 15, wherein the second hinge housing has a stepped surface formed on the inner peripheral surface of the second hinge housing that extends in the circumferential direction at a level different from that of the second stopper to receive the first stopper.

18. The portable terminal as claimed in claim 10, wherein the hinge device further comprises:
   a support ring coupled to an end of the second hinge housing, the support ring protruding from the outer peripheral surface of the second hinge housing in the radial direction.

19. The portable terminal as claimed in claim 10, wherein the first hinge housing comprises:
   a first housing portion enclosed by the second hinge housing; and
   a second housing portion extending from an end of the first housing portion and having an outer peripheral surface adapted to be flush with the outer peripheral surface of the second housing when the second housing is coupled thereto, the first and second housing portion having a stepped surface located between them.

20. The portable terminal as claimed in claim 19, wherein the second housing portion has a longitudinally extending first slit on the outer peripheral surface,
   the second hinge housing has a longitudinally extending second slit, and
   the stepped surface between the first and second housing portions has a third slit to connect the first slit to the interior of the second hinge housing.

21. The portable terminal as claimed in claim 12, wherein the second hinge cam is adjacent to the fixing body.

22. A portable terminal comprising:
   a first housing having a first side hinge arm formed on one side;
   a second housing having a second side hinge arm formed on the side of the second housing that faces the end of the first side hinge arm, the second housing rotating towards or away from the first housing to be folded or unfolded;
   a first hinge housing fixed to one of the first and the second side hinge arms;
   a hinge shaft rotatably coupled to the first hinge housing; and
   a second hinge housing fixed to the remaining one of the first and second side hinge arms and the hinge shaft while enclosing the outer peripheral surface of the first hinge housing.

* * * * *